US009718923B2

(12) United States Patent
Miller et al.

(10) Patent No.: US 9,718,923 B2
(45) Date of Patent: Aug. 1, 2017

(54) HIGH MOLECULAR WEIGHT, MONOESTERIFIED POLYMIDE POLYMER CONTAINING A SMALL AMOUNT OF BULKY DIAMINE

(71) Applicants: Chevron U.S.A. Inc., San Ramon, CA (US); Georgia Tech Research Corporation, Atlanta, GA (US)

(72) Inventors: Stephen Joseph Miller, San Francisco, CA (US); William John Koros, Atlanta, GA (US); Nanwen Li, Atlanta, GA (US); Gongping Liu, Atlanta, GA (US)

(73) Assignees: Chevron U.S.A. Inc., San Ramon, CA (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/757,447

(22) Filed: Dec. 23, 2015

(65) Prior Publication Data
US 2016/0177034 A1    Jun. 23, 2016

Related U.S. Application Data

(60) Provisional application No. 62/096,350, filed on Dec. 23, 2014.

(51) Int. Cl.
*C08G 73/10* (2006.01)
*B01D 53/22* (2006.01)
*B01D 71/64* (2006.01)
*B01D 67/00* (2006.01)
*B01D 71/82* (2006.01)

(52) U.S. Cl.
CPC ....... *C08G 73/1028* (2013.01); *B01D 53/228* (2013.01); *B01D 67/0006* (2013.01); *B01D 71/64* (2013.01); *B01D 71/82* (2013.01); *C08G 73/101* (2013.01); *C08G 73/1039* (2013.01); *C08G 73/1042* (2013.01); *C08G 73/1067* (2013.01); *B01D 2256/245* (2013.01); *B01D 2257/504* (2013.01); *B01D 2323/30* (2013.01); *Y02C 10/10* (2013.01); *Y02P 20/152* (2015.11)

(58) Field of Classification Search
None
See application file for complete search history.

(56) References Cited

U.S. PATENT DOCUMENTS

| 6,755,900 B2 | 6/2004 | Koros et al. |
| 6,932,859 B2 | 8/2005 | Koros et al. |
| 7,247,191 B2 | 7/2007 | Koros et al. |
| 7,981,974 B2 | 7/2011 | Miller et al. |
| 8,066,799 B2 | 11/2011 | Miller et al. |
| 8,328,906 B2 | 12/2012 | Miller et al. |
| 8,337,598 B2 | 12/2012 | Yates et al. |
| 8,394,182 B2 | 3/2013 | Koros et al. |
| 2009/0182097 A1* | 7/2009 | Miller ............... B01D 67/0006 525/420 |
| 2012/0297984 A1 | 11/2012 | Chung |
| 2013/0220119 A1 | 8/2013 | Koros et al. |

FOREIGN PATENT DOCUMENTS

WO    2016105526    6/2016

OTHER PUBLICATIONS

ISR from corresponding International Application No. PCT/US2015/000288 mailed Mar. 17, 2016.
W. J. Koros and G. K. Fleming "Membrane-based gas separation", Journal of Membrane Science, 1993, vol. 83, pp. 1-80.
Ekiner O.M. et al., "Polyaramide Hollow Fibers for Hydrogen/Methane Separation—Spinning and Properties", Journal of Membrane Science 53 (1990) 259-273.
Prasad et al., "Evolution of membranes in commercial air separation", J. Membrane Sci., 94, 225-248 (1994).
C.L. Rohn, Analytical Polymer Rheology, Hanser-Gardener, New York (1995). J. Heijboer, Intl. J. Polym. Mater., 6, 11 (1977).
R. F. Boyer, "Dependence of Mechanical Properties on Molecular Motion in Polymers", Polym. Eng. Sci., 8 (3), 161 (1968).
P. Dauger-Osguthorpe, V.A. Roberts, D.J. Osguthorpe, J. Wolff, M. Genest and A.T. Hagler, Structure and energetics of ligand binding to proteins: E. colidihydrofolate reductase-trimethoprim, a drug-receptor system. Proteins: Struct., Funct., Genet. 4, 31-47 (1988).
International Search Report for corresponding Application No. PCT/US2016/026941 mailed Aug. 18, 2016.
International Search Report for corresponding Application No. PCT/US2016/026949 mailed Aug. 18, 2016.
Lina Wang et al., "The gas permeation properties of 6FDA-2, 4, 6-trimethyl-1, 3-phenylenediamine (TMPDA)/1, 3-phenylenediamine (mPDA) copolyimides" Polymer Bulletin v. 60, No. 1, Oct. 2, 2007.

* cited by examiner

*Primary Examiner* — Ana Woodward
(74) *Attorney, Agent, or Firm* — Melissa M. Hayworth; E. Joseph Gess; Mary R. Bram

(57) ABSTRACT

One method as described herein relates to making a high molecular weight, monoesterified polyimide polymer using a small amount of bulky diamine. These high molecular weight, monoesterified polyimide polymers are useful in forming crosslinked polymer membranes with high permeance that are useful for the separation of fluid mixtures. Another method as described herein relates to making the crosslinked membranes from the high molecular weight, monoesterified polyimide polymer containing a small amount of bulky diamine. The small amount of bulky diamine allows for formation of both the high molecular weight polyimide polymer and for covalent ester crosslinks via reaction of the carboxylic acid groups with a diol crosslinking agent. This small amount of bulky diamines reduces chain mobility or segmental motion during crosslinking and reduces large loss of permeance. As such, this method provides a crosslinked membrane with good permeance and selectivity.

23 Claims, 3 Drawing Sheets

US 9,718,923 B2

HIGH MOLECULAR WEIGHT, MONOESTERIFIED POLYIMIDE POLYMER CONTAINING A SMALL AMOUNT OF BULKY DIAMINE

RELATED APPLICATION

This application claims priority to U.S. Provisional No. 62/096,350 filed Dec. 23, 2014, entitled "High Molecular Weight, Monoesterified Polyimide Polymer Containing a Small Amount of Bulky Diamine", the contents of which are incorporated herein by reference in their entirety.

FIELD OF ART

One method as described herein relates to making a high molecular weight, monoesterified polyimide polymer using a small amount of bulky diamine. These high molecular weight, monoesterified polyimide polymers are useful in forming crosslinked polymer membranes with high permeance, which can be used for the separation of fluid mixtures.

BACKGROUND

Polymeric membranes for separating mixtures of gases, such as methane and carbon dioxide are known. For example, U.S. Pat. Nos. 7,247,191; 6,932,859; 6,755,900; 7,981,974; 8,066,799; 8,337,598; 8,394,182; and 8,328,906, which documents are incorporated by reference herein in their entireties, teach crosslinkable polymers and crosslinked hollow fiber membranes made from such crosslinkable polymers. These patents particularly describe a crosslinkable polyimide polymer. The crosslinkable polyimide polymer can be made by monoesterifying a polyimide polymer with a crosslinking agent.

A crosslinked hollow fiber membrane can be made by forming fibers from the crosslinkable polyimide polymer and transesterifying the crosslinkable polyimide polymer within the fibers. More specifically, the crosslinkable polyimide polymer can be formed into crosslinkable fibers, which are then subjected to transesterification conditions to create covalent ester crosslinks between the crosslinkable polyimide polymer within the fibers. Crosslinked hollow fiber membranes can be incorporated into a separation module. Other types of membranes for separation include flat sheet separation membranes or flat stack permeators.

Separation modules utilizing hollow fiber membranes include a larger surface area than separation modules utilizing flat sheet or flat stack permeators. Therefore, hollow fiber separation modules have significant separation capability even in a reasonably compact size module. Module size is important in implementing separation modules on offshore platforms, where space and weight are at a premium, to separate mixtures of gases from hydrocarbon producing wells.

The crosslinked hollow fiber membranes have good selectivity; however, the transesterification conditions to create covalent ester crosslinks between the crosslinkable polyimide polymer within the fibers causes a huge drop in permeance. The permeance loss can be, for example, about 50% or even as high as around 70% or higher.

Therefore, there remains a need for a method of making a high molecular weight, monoesterified polyimide polymer which retains its selectivity and permeability when transesterified. The monoesterified polymer also needs to have good strength, flexibility, and/or spinnability. Further there is a need for making separation membranes having improved permeance and selectivity.

SUMMARY

One method as described herein relates to making a high molecular weight, monoesterified polyimide polymer using a small amount of bulky diamine. These high molecular weight, monoesterified polyimide polymers are useful in forming crosslinked polymer membranes with high permeance that are useful for the separation of fluid mixtures. Another method as described herein relates to making the crosslinked membranes from the high molecular weight, monoesterified polyimide polymer containing a small amount of bulky diamine. Yet another method as described herein relates to using the crosslinked membranes to separate at least one component, such as $CO_2$, from a feed stream including more than one component, including for example $CO_2$ and $CH_4$.

The present disclosure relates to a method for making a high molecular weight, monoesterified polyimide polymer comprising the following steps: (a) preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are bulky diamino compounds; and (b) treating the polyimide polymer with a diol at esterification conditions in the presence of dehydrating conditions to form a monoesterified polyimide polymer, wherein the dehydrating conditions at least partially remove water produced during step (b).

In step (a), the monomers polymerize in a polymerization reaction to provide a polyamide polymer comprising amide bonds. An imidization reaction takes place whereby the amide bonds form imide bonds to provide a polyimide polymer. The monomers comprise dianhydride monomers, diamino monomers without carboxylic acid functional groups, and diamino monomers with carboxylic acid functional groups. Of the diamino monomers, 2 to 10 mole % are bulky diamino compounds. In certain embodiments, 2 to 5 mole % are bulky diamino compounds.

In step (b), the polyimide polymer is monoesterified to provide the monoesterified polyimide polymer. The dehydrating conditions of step (b) can reduce, substantially eliminate, or completely eliminate loss in average molecular weight associated with monoesterification or even increase the average molecular weight of the monoesterified polyimide polymer relative to the polyimide polymer.

Step (b) can further comprise treating the polyimide polymer with the diol in the presence of an acid catalyst to facilitate the monoesterification reaction. When the acid catalyst is present in an amount less than that typically used in conventional monoesterification reactions without water removal, the monoesterified polyimide polymer partially retains, fully retains, or even increases its molecular weight.

The small amount of bulky diamine allows for formation of both the high molecular weight polyimide polymer and for covalent ester crosslinks via reaction of the carboxylic acid groups with a diol crosslinking agent.

In some embodiments, step (a) also occurs under dehydrating conditions that at least partially remove water produced during the imidization reaction of step (a).

The present disclosure also relates to a method of making a crosslinked membrane comprising the following steps: (a)

preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are bulky diamino compounds; (b) treating the polyimide polymer with a diol at esterification conditions in the presence of dehydrating conditions to form a monoesterified polyimide polymer; and (c) subjecting the monoesterified polyimide polymer to transesterification conditions to form a crosslinked membrane; wherein the dehydrating conditions at least partially remove water produced during step (b).

The small amount of bulky diamine allows for formation of both the high molecular weight polyimide polymer and for covalent ester crosslinks via reaction of the carboxylic acid groups with a diol crosslinking agent. The methods provide a crosslinked membrane with good permeance and selectivity. In certain embodiments, 2 to 5 mole % of the diamino monomers are bulky diamino compounds.

In some embodiments, the methods disclosed herein include a step of sealing defects in the fiber by coating the fiber with polydimethylsiloxane (PDMS) or a cross-linked silicone coating.

BRIEF DESCRIPTION OF THE DRAWINGS

In FIG. 2, permeability is shown in Barrers and selectivity is unitless.

DETAILED DESCRIPTION

Figure 1:
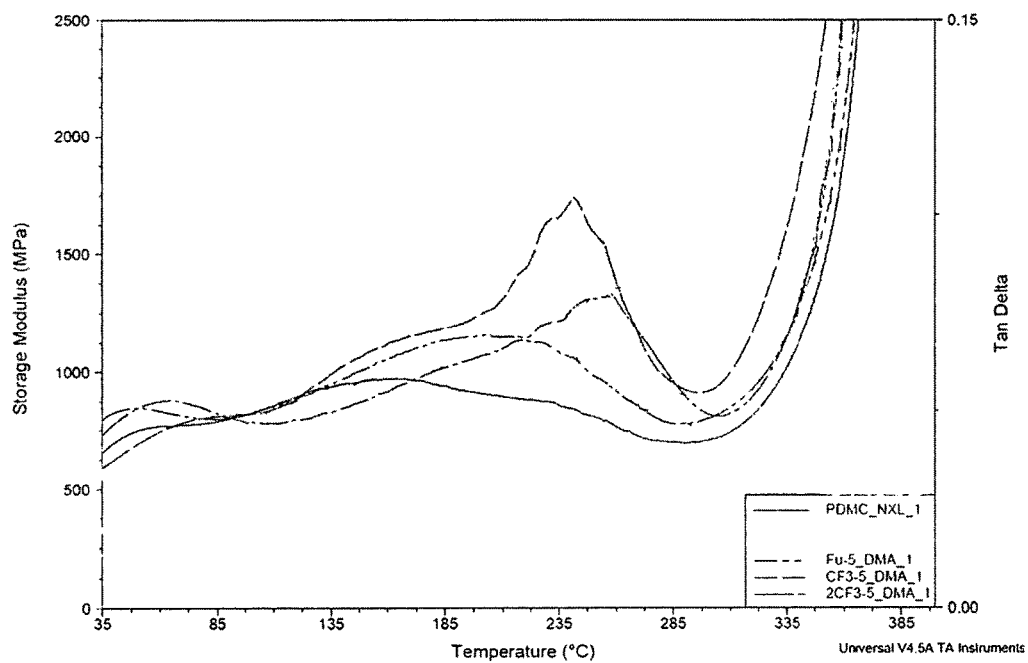
FIG. 1 graphs the sub-Tg of PDMC (propane diol monoester crosslinked polymer), and for the three polymers: PDMC containing 5 mol % Fu, PDMC containing 5 mol % CF3 and PDMC containing 5 mol % 2CF3 and shows that the sub-Tg of these polymers are about 150° C., 195° C., 240° C. and 255° C., respectively. The abbreviations Fu, CF3, and 2CF3 are defined herein.

A novel method of making a high molecular weight, monoesterified polyimide polymer is disclosed herein. Without being bound by theory, it is believed that incorporating a small amount of bulky diamines into the high molecular weight polyimide polymer inhibits segmental motion and reduces chain mobility or flexibility during crosslinking. With too much segmental motion, free volume that is needed for good permeation is lost. It is also believed that the small amount of bulky diamines increases sub-Tg and may increase the sub-Tg above the temperature at which crosslinking is performed. Segmental motion can be possible at the lower temperature at which crosslinking is performed, so inhibition of segmental motion by the bulky diamines can be important with lower crosslinking temperatures. For these reasons, it is believed that the small amount of bulky diamines reduces the large loss of permeance seen in similar crosslinked polyimide membranes that are made with dianhydride and smaller diamino monomers.

The monoesterified, polyimide polymer incorporating a small amount of bulky diamines has a high molecular weight and retains its good spinnability and ease of crosslinking. Although, in some embodiments, the monoesterified polyimide polymer incorporating a small amount of bulky diamines may not be spun into defect-free hollow fiber and may contain defects in the skin of the fiber, these defects can be sealed by coating the hollow fiber with polydimethylsiloxane (PDMS) or a cross-linked silicone coating. Accordingly, the methods as described herein may include optionally dip-coating with a layer of polydimethylsiloxane or a cross-linked silicone coating which serves to plug any defects which may have formed in the process. This is a conventional method for sealing defects. The defects can be sealed pre-crosslinking, post-crosslinking, or both pre-crosslinking and post-crosslinking. This post-treating process is described in U.S. Pat. No. 8,337,598, which is incorporated by reference in its entirety.

The crosslinked polyimide membrane also retains its good permeance and selectivity. The permeance loss from crosslinking can be, for example, around 50% and even as high as around 70% or higher, in similar crosslinked polyimide membranes, which are made only with dianhydride and smaller diamino monomers. With incorporation of a small amount of bulky diamine as disclosed herein, in some embodiments, the permeance of the crosslinked membrane can be substantially maintained during crosslinking. In other words, no significant loss (i.e. less than 10%) in permeance is observed after crosslinking. In other embodiments, the permeance of the crosslinked membrane can be reduced by only 10% to 30% during crosslinking compared to the loss of permeance of a crosslinked membrane made without the bulky diamino compounds that is typically reduced by at least about 50% during crosslinking. In any case, the permeance of a crosslinked membrane made with the bulky diamino compounds is measurably greater than the permeance of a crosslinked membrane made without the bulky diamino compounds. The crosslinked membrane also retains its good selectivity for separating $CO_2$ and $CH_4$. The selectivity of the crosslinked membrane is either the same or reduced by 10% or less compared to the selectivity of a similar crosslinked polyimide membrane made with dianhydride and smaller diamino monomers.

The membranes as described herein have a $CO_2$ permeance of at least 20 GPU and a $CO_2/CH_4$ selectivity of greater than 20, at 35° C. and a pressure of 100 psia. In some embodiments the membranes have a $CO_2$ permeance of at least 40 GPU and a $CO_2/CH_4$ selectivity of greater than 20, at 35° C. and a pressure of 100 psia. The techniques for determining and measuring permeance and selectivity are well known to those of skill in the art. These techniques are taught for instance in U.S. Pat. Nos. 6,755,900; 6,932,859; 7,247,191; and 8,394,182, the contents of which are incorporated by reference in their entireties.

As used herein, the term "bulky diamine" refers to diamines of about 5 Å to about 12 Å. In certain embodiments, the bulky diamines are diamines of about 6 Å to about 12 Å. The bulky diamines also enhance the sub-Tg. As such, the bulky diamine provides an enhancement in sub-Tg of at least 30° C., and in certain embodiments an enhancement in sub-Tg of at least 40° C.

Bulky diamines include, for example, 2,2'-bis(trifluoromethyl)benzidine (also known as 2,2'-bis(trifluoromethyl)-[1,1'-biphenyl]-4,4'-diamine and 2CF3); 5-(trifluoromethyl)-1, 3-phenylenediamine; 4,4'-(9-fluorenylidene)dianiline (also known as CF3); 4,4'-(hexafluoroisopropylidene)dianiline (also known as Fu); 4,4'-(Hexafluoroisopropylidene)bis(p-phenyleneoxy)dianiline; 2,2-bis(4-aminophenyl)hexafluoropropane (also known as 6FDA); 2,2-bis[4-(4-aminophenoxy)phenyl]hexafluoropropane (also known as 6FODA), and the like. In certain embodiments, the bulky diamines are 2,2'-bis(trifluoromethyl)benzidine (2CF3), 5-(trifluoromethyl)-1,3-phenylenediamine, or 4,4'-(9-fluorenylidene)dianiline (CF3). The bulky diamines are 2 to 10 mole % of the diamino monomers used to prepare the polyimide polymer and in certain embodiments, the bulky diamines are 2 to 5 mole % of the diamino monomers used to prepare the polyimide polymer.

The bulky diamine size is measured as described as follows. The molecule structures were built by Material Studio 6.1 (Accelrys Software Inc.). Materials Studio 6.1, Accelrys, Inc.: San Diego, Calif., 2012. Their geometries were optimized using the cvff force-field implemented in the "Forcite" module. See P. Dauger-Osguthorpe, V. A. Roberts, D. J. Osguthorpe, J. Wolff, M. Genest and A. T. Hagler, Structure and energetics of ligand binding to proteins: *E. coli* dihydrofolate reductase-trimethoprim, a drug-receptor system. Proteins: Struct., Funct., Genet. 4, 31-47 (1988). The optimized molecular structures were then exported to the CrystalMaker program (Version 8.7 for Mac OS, Crystal Maker Software Ltd.) from which physical dimensions of the molecules are determined. CrystalMaker 8.7, CrystalMaker Software Ltd, Yarnton, England, 2013. Covalent radii (from built-in database of Material Studio 6.1) of the outmost atoms are added to both the length and diameter values. The diamine size is then the distance between the axis of the two amine groups in each molecule and the dimension perpendicular to this axis, which could be measured directly by the CrystalMaker program.

By way of example, the size of 2CF3 was measured as 7.3 Å and the size of CF3 was measured as 6.8 Å.

Also as used herein the term "high molecular weight, monoesterified polyimide polymer" refers to a monoesterified polyimide polymer that has an average molecular weight of between about 40,000 and about 400,000. For example, the high molecular weight, monoesterified polyimide polymer can have an average molecular weight between about 100,000 and about 300,000.

Disclosed herein is a novel method of making a crosslinked membrane utilizing the high molecular weight, monoesterified polyimide polymer containing a small amount of bulky diamines. The method includes forming the high molecular weight, monoesterified polyimide polymer including a small amount of bulky diamines. The method further includes crosslinking the monoesterified, polyimide polymer to form the crosslinked membrane. The crosslinked membrane exhibits improved permeance and good selectivity.

In one embodiment, the crosslinked membrane is a crosslinked hollow fiber membrane. The crosslinked hollow fiber membrane is made utilizing the high molecular weight, monoesterified polyimide polymer including a small amount of bulky diamines. The method includes forming monoesterified hollow fibers from the monoesterified polyimide polymer containing a small amount of bulky diamines. The method further includes crosslinking the monoesterified, polyimide polymer containing a small amount of bulky diamines to form the crosslinked hollow fiber membrane.

The method can specifically include a novel process for spinning monoesterified hollow fibers from a novel dope composition comprising the monoesterified, polyimide polymer containing a small amount of bulky diamines.

The high molecular weight, monoesterified polyimide polymer containing a small amount of bulky diamines as disclosed herein also can be cast to form sheets or films. The sheets or films can be cast onto a suitable support to provide a composite sheet.

Definitions

The following terms are used throughout the specification and have the following meanings unless otherwise indicated.

As used herein, the term "carboxylic acid functional group" refers to a pendant group of —COOH—.

The term "diol" refers to a chemical compound containing two hydroxyl groups.

The term "carbodiimide" means a chemical compound containing the functional group N=C=N.

The term "dianhydride" refers to any compound that contains two anhydride

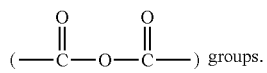 groups.

The term "halogenated alkyl" means a straight-chain or branched saturated monovalent hydrocarbon group of one to twelve carbon atoms, wherein at least one of the carbon atoms is replaced by a halogen atom (e.g. fluoromethyl, 1-bromo-ethyl, 2-chloro-pentyl, 6-iodo-hexyl, and the like).

The term "halo" or "halogenated" refers to a functional group including a halogen atom such as fluorine, chlorine, bromine, or iodine.

The term "phenyl" means an aromatic group of six carbon atoms having the formula —$C_6H_5$.

The term "alkyl" means a straight-chain or branched saturated monovalent hydrocarbon group of one to twelve carbon atoms (e.g. methyl, ethyl, i-propyl, and the like). Alkyl groups have the formula $C_nH_{2n+1}$ where n is a positive non-zero integer.

The term "diamino cyclic compound" means a chemical compound having a ring structure of three to twelve carbon atoms where the ring structure is functionalized by two amino or substituted amino groups.

The term "amino" means a functional group having the formula —NR'R" where R' and R" are independently H, alkyl, cycloalkyl, and aryl.

The term "cycloalkyl" means a cyclic saturated monovalent hydrocarbon group containing 3 to 12 carbon atoms having a single cyclic ring or multiple condensed rings. Such cycloalkyl groups include, by way of example, cyclopropyl, cyclohexyl, cyclooctyl, adamantanyl, and the like.

The term "aliphatic" refers to non-aromatic organic compounds, in which carbon atoms are joined together in straight or branched chains. Aliphatic includes paraffinic (e.g., alkyl), olefinic (e.g., alkenyl), and alkynyl compounds.

The term "antilyotropic salt" refers to a salt that interacts with solvent molecules rather than polymer molecules.

The term "amide" means a functional group having a carbonyl group (C=O) linked to a nitrogen atom or a compound that includes this functional group.

The term "ester" means a functional group having a carbonyl group (C=O) linked to a alkoxy group.

The term "alkoxy" refers to an alkyl group linked to an oxygen such as, for example, methoxy (—$OCH_3$) or ethoxy (—$OCH_2CH_3$).

The term "aryl" refers to an unsaturated aromatic carbocyclic group of from 6 to 20 carbon atoms having a single ring (e.g., phenyl) or multiple condensed (fused) rings (e.g., naphthyl or anthryl). Exemplary aryls include phenyl, naphthyl and the like.

The term "alkenyl" refers to a linear or branched unsaturated monovalent hydrocarbon group having 2 to 12 carbon atoms and containing at least one, for example, from 1 to 3 double bond(s). This term is exemplified by groups such as ethenyl (—CH=CH$_2$), 2-propenyl (—CH$_2$—CH=CH$_2$), and the like.

The term "alkynyl" refers to a linear or branched monovalent hydrocarbon group having 2 to 12 carbon atoms and containing at least one, for example, from 1 to 3 triple bond(s). This term is exemplified by groups such as ethynyl (—C≡CH), 2-propynyl (—CH$_2$—C≡CH), n-butynyl (—CH$_2$—CH$_2$—C≡CH), and the like.

As used herein, the term "reduce" means to decrease or diminish.

Whenever used herein, the term "molecular weight" or "average molecular weight" means weight average molecular weight as measured by Gel Permeation Chromatography (GPC) using polystyrene as the standard. This method is described in ASTM D5296-05.

"Draw ratio" means the ratio of the take-up rate to the extrusion rate.

The "Glass Transition Temperature" (Tg) is the temperature where the polymer transitions from hard and glassy to soft and rubbery.

The term "sub-T$_g$" refers to what is also referenced as T$_\beta$, the β-relaxation temperature at which polymer segmental motion is ceased.

The term "permeability" or P refers to a pressure- and thickness-normalized flux of a given component such as CO$_2$. Permeability can be measured, for example, in Barrers.

The standard unit for measuring the permeability of gases through a supported gas separation membrane is the Barrer, which is defined as follows:

$$1 \text{ Barrer} = \frac{10^{-10} \text{cm}^3 (STP) \times \text{cm}}{\text{cm}^2 \times \text{sec.} \times (\text{cm. Hg})}$$

wherein the flux (flow rate) in units of cm$^3$/cm$^2$×sec.; being volume per seconds of permeated gas at standard temperature and pressure, cm is the thickness of the film, cm$^2$ is the area of film, and cm. Hg is the pressure (or driving force).

The term "permeance" refers to the ratio of permeability to membrane thickness.

The term "selectivity" refers to the ratio of the permeabilities of two components across a membrane (i.e., P$_A$/P$_B$, where A and B are the two components).

The selectivity of a supported gas separation membrane in separating a two-component fluid mixture is defined as the ratio of the rate of passage of the more readily passed component to the rate of passage of the less readily passed component. Selectivity may be obtained directly by contacting a supported gas separation membrane with a known mixture of gases and analyzing the permeate. Alternatively, a first approximation of the selectivity is obtained by calculating the ratio of the rates of passage of the two components determined separately on the same gas separation membrane. Rates of passage may be expressed in Barrer units. As an example of selectivity, a O$_2$/N$_2$=10 indicates that the subject membrane allows oxygen gas to pass through at a rate ten times that of nitrogen.

The productivity (permeance) of a gas separation membrane is measured in GPUs which is defined as follows:

$$GPU = \frac{10^{-6} \times \text{cm}^3 (STP)}{\text{cm}^2 \times \text{sec.} \times (\text{cm. Hg})}$$

The membranes as disclosed herein have a CO$_2$ permeance of at least 20 GPU and a CO$_2$/CH$_4$ selectivity of greater than 20, at 35° C. and a pressure of 100 psia. In some embodiments, the membranes have a CO$_2$ permeance of at least 40 GPU and a CO$_2$/CH$_4$ selectivity of greater than 20, at 35° C. and a pressure of 100 psia.

Permeability, permeance, and selectivity are measured by techniques well known to those of skill in the art, as described for example in U.S. Pat. No. 7,247,191, the contents of which are incorporated by reference in their entirety. As described herein, permeance and selectivity are measured at 35° C. and a pressure of 100 psia.

It is noted that while permeance and selectivity are measured at 35° C. and a pressure of 100 psia as the standard for comparison herein, permeance and selectivity can also be measured at higher pressures, such as 200 psia. If permeance loss and selectivity are measured at 200 psia, then these measurements would be expected to demonstrate poorer performance than when measured at 100 psia. Accordingly, if the standards for permeance loss and selectivity are met when measuring at a pressure of 200 psia, then the standards for permeance loss and selectivity should be assumed to be met measuring at a pressure of 100 psia. For example, if the membranes exhibit no significant loss (i.e. less than 10%) in permeance after crosslinking when measured at 35° C. and a pressure of 200 psia, then the membranes should be assumed to exhibit no significant loss (i.e. less than 10%) in permeance after crosslinking when measured at 35° C. and a pressure of 100 psia.

The term "PDMC" refers to propane diol monoester crosslinked polymer having the structure:

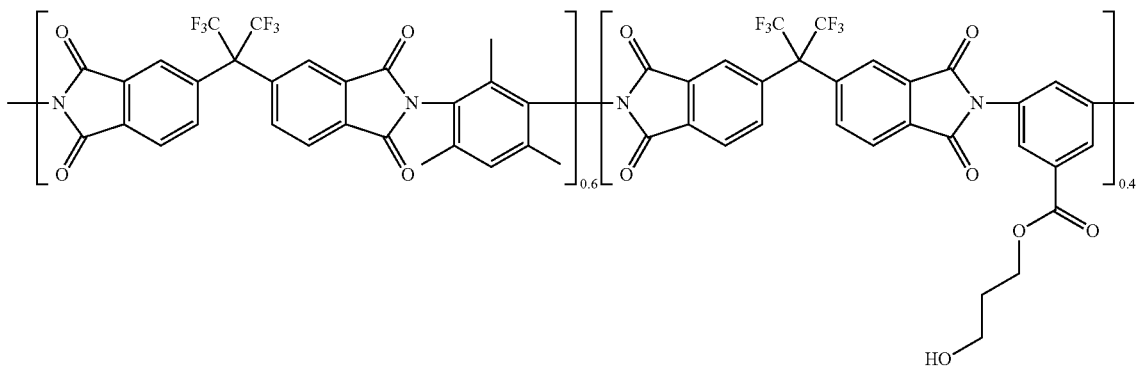

Method of Making Monoesterified Polyimide Polymer with Small Amount of Bulky Diamine The method of making a monoesterified, polyimide polymer as described herein comprises the following steps:

(a) preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are replaced with bulky diamino compounds; and (b) treating the polyimide polymer with a diol at esterification conditions in the presence of dehydrating conditions to form a monoesterified polyimide polymer, wherein the dehydrating conditions at least partially remove water produced during step (b).

In some embodiments, the monoesterified polyimide polymer incorporating a small amount of bulky diamines may contain defects in the skin of the polymer. These defects can be sealed by coating the hollow fiber with polydimethylsiloxane (PDMS) or a cross-linked silicone coating. In these embodiments, the method may further comprise sealing the monoesterified polyimide polymer with polydimethylsiloxane (PDMS) or a cross-linked silicone coating.

Step (a)—Polymerization Reaction and Imidization Reaction

In step (a), the monomers polymerize in a polymerization reaction to provide a polyamide polymer comprising amide bonds. An imidization reaction takes place whereby the amide bonds form imide bonds to provide a polyimide polymer. The monomers comprise dianhydride monomers, diamino monomers without carboxylic acid functional groups, and diamino monomers with carboxylic acid functional groups. Of the diamino monomers, 2 to 10 mole % are bulky diamino compounds. In certain embodiments, 2 to 5 mole % of the diamino monomers are bulky diamino compounds. The small amount of bulky diamine allows for formation of a high molecular weight polyimide polymer.

Step (a) involves preparing a polyimide polymer comprising carboxylic acid functional groups from a reaction solution comprising monomers and at least one solvent. The monomers and at least one solvent are combined such that the monomers dissolve in the solvent to form the reaction solution. Thereafter, the monomers polymerize through the formation of amide bonds to provide a polyamide polymer. The polyamide polymer is then subjected to imidization conditions whereby the amide bonds are converted to imide rings to provide a polyimide polymer.

The monomers comprise dianhydride monomers, diamino monomers without carboxylic acid functional groups, and diamino monomers with carboxylic acid functional groups. Of the diamino monomers, 2 to 10 mole % are bulky diamino compounds. In certain embodiments, 2 to 5 mole % of the diamino monomers are bulky diamino compounds.

The imidization reaction of step (a) can further take place under dehydrating conditions. Water is produced as a by-product during the imidization reaction. Such dehydrating conditions at least partially remove this water by-product from the reaction solution. It is desirable to remove water in step (a) because water produced during the imidization reaction can degrade the imide rings of the polyimide polymer during the subsequent monoesterification reaction. This residual imidization water can also cause chain scissioning of the polyimide polymer as the water produced during the monoesterification reaction. While the polyimide polymer could be precipitated out of the reaction solution as in conventional processes and then subjected to monoesterification, including dehydrating conditions in step (a) makes such a precipitation step unnecessary and the entire reaction can be a "one-pot" synthesis.

Monomers

The monomers can comprise between about 15 and about 25 weight percent of the reaction solution. The monomers comprise dianhydride monomers, diamino monomers without carboxylic acid functional groups, and diamino monomers with carboxylic acid functional groups. Of the diamino monomers, about 2 to about 10 mole % are bulky diamino compounds. In one embodiment, about 2 to about 5 mole % of the diamino monomers are bulky diamino compounds.

It is important that at least some of the monomers include carboxylic acid functional groups such that the resultant polyimide polymer comprises carboxylic acid functional groups. The diamino monomers can include diamino cyclic compounds and diamino aromatics. As described herein, of the diamino monomers, about 2 to about 10 mole % are bulky diamino compounds.

For example, the monomers can include dianhydride monomers A, diamino monomers without carboxylic acid functional groups B, and diamino monomers with carboxylic acid functional groups C; wherein 2 to 10 mole % of the diamino monomers are bulky diamino compounds D.

The dianhydride monomers A can be a dianhydride of formula (I):

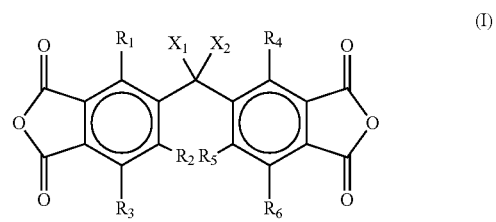

wherein $X_1$ and $X_2$ are independently halogenated alkyl, phenyl or halogen; and $R_1$, $R_2$, $R_3$, $R_4$, $R_5$, and $R_6$ are independently H, alkyl, or halogen.

If the monomers are comprised of the monomers A, B, and C, the ratio of B to C can be between 1:4 and 8:1. Of the monomers B and C, about 2 to about 10 mole % of the diamino monomers B and C are bulky diamino compounds D.

The monomer A can be 4,4'-(hexafluoroisopropylidene) diphthalic anhydride (6FDA), which is also known as (2,2-bis(3,4-dicarboxyphenyl)hexafluoropropane. 6FDA has the following formula:

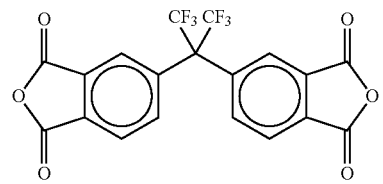

Including 6FDA in the monomers provides stability to the polyimide polymer because 6FDA has limited rotational ability.

Monomers with limited rotational ability, like 6FDA, are desirable because they increase the selectivity of the membrane made according to the method disclosed herein.

Monomers with bulky side groups, like (CF$_3$)$_2$ in 6 FDA, also inhibit chain packing, which increases permeance of molecules through the membrane. Both selectivity and permeance are important for efficient and productive separations. Further reference to these structure property relationships can be found in Koros and Fleming, *Journal of Membrane Science*, 83, 1-80 (1993), herein incorporated by reference in its entirety.

The monomer B, a diamino cyclic compound without a carboxylic acid functionality, can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenezene, or tetramethyldiaminobenzene. The monomer B can also be 2,4,6-trimethyl-m-phenylenediamine (DAM), which is represented by the following formula:

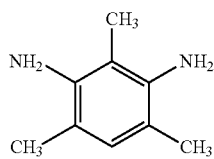

The monomer C, a diamino cyclic compound with a carboxylic acid functionality, can be diamino benzoic acid. It is represented by the following formula:

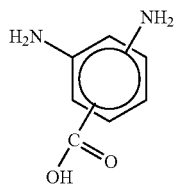

More specifically, the monomer C can be 3,5 diaminobenzoic acid (DABA).

The bulky diamino compounds D are diamines of about 5 Å to about 12 Å. In certain embodiments, the bulky diamines are diamines of about 6 Å to about 12 Å. Bulky diamino compounds D include, for example, 2,2'-bis(trifluoromethyl)benzidine (also known as 2,2'-bis(trifluoromethyl)-[1,1'-biphenyl]-4,4'-diamine and 2CF3); 5-(trifluoromethyl)-1,3-phenylenediamine; 4,4'-(9-fluorenylidene)dianiline (also known as CF3); 4,4'-(hexafluoroisopropylidene)dianiline (also known as Fu); 4,4'-(Hexafluoroisopropylidene)bis(p-phenyleneoxy)dianiline; 2,2-bis(4-aminophenyl)hexafluoropropane (also known as 6FDA); 2,2-bis[4-(4-aminophenoxy)phenyl]hexafluoropropane (also known as 6FODA), and the like. In certain embodiments, the bulky diamines are 2,2'-bis(trifluoromethyl)benzidine (2CF3), 5-(trifluoromethyl)-1,3-phenylenediamine, or 4,4'-(9-fluorenylidene)dianiline (CF3).

The bulky diamines are 2 to 10 mole % of the diamino monomers used to prepare the polyimide polymer and in certain embodiments, the bulky diamines are 2 to 5 mole % of the diamino monomers used to prepare the polyimide polymer.

In one embodiment of the method as described herein, the monomers include A, B, C, and D, where A is 6FDA, B is DAM, C is DABA and D is 2,2'-bis(trifluoromethyl)benzidine (2CF3), 5-(trifluoromethyl)-1,3-phenylenediamine, or 4,4'-(9-fluorenylidene)dianiline (CF3). In this embodiment, the 6FDA content of the monomer mixture is about 50 weight percent and the remaining about 50 weight percent of the monomer mixture is composed of DAM, DABA, and 2CF3, 5-(trifluoromethyl)-1,3-phenylenediamine or CF3. As described above, 2 to 10 mole % of the DAM and DABA monomer mixture is composed of the bulky diamino compound D (2CF3, 5-(trifluoromethyl)-1,3-phenylenediamine or CF3).

In one example, the 6FDA content of the monomer mixture can be about 50 weight percent and the remaining about 50 weight percent can be about 35-40 mole percent DABA, about 55-60 mole percent DAM, and about 2-5 mole percent 2CF3, 5-(trifluoromethyl)-1,3-phenylenediamine or CF3.

Whichever monomers are used, according to some embodiments of the method as described herein, they can be purified prior to step (a). The monomers can be purified by techniques known in the art, for example, sublimation or recrystallization.

Solvents

The monomers are dissolved in at least one solvent to create a reaction solution and facilitate polymerization. The resulting polyamide polymer remains in the reaction solution for imidization. The at least one solvent can comprise between about 75 and about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
|---|---|
| N-Methyl-2-pyrrolidione (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Dehydrating Conditions

If dehydrating conditions are utilized during step (a) to remove water, the concentration of water in the reaction solution can be maintained at between about 0 weight percent and about 0.26 weight percent.

The dehydrating conditions can be the presence of a chemical dehydrating agent and/or a mechanical dehydrating agent. The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction of step (a). For example, it does not decrease the imidization reaction rate or decrease the monoesterified, polyimide polymer yield.

Polymerization Conditions

In the polymerization reaction of step (a), monomers polymerize in the reaction solution to form a polyamide polymer containing a small amount of bulky diamine. Polymerization can occur at room temperature while the reaction solution is stirred or otherwise agitated. Solvent concentration during polymerization is between about 75 and about 95 weight percent of the reaction solution.

Imidization Conditions

In the imidization reaction of step (a), the amide bonds of the polyamide polymer form imide rings to provide the polyimide polymer. The imidization reaction in step (a) occurs over an extended period of time, approximately 12-36 hours. Such an extended period of time ensures that the imidization reaction proceeds to completion, which is important with respect to yield of the polyimide polymer. The imidization reaction can occur at temperatures between about 160° C. and about 200° C. Solvent concentration during imidization is between about 75 and about 95 weight percent of the reaction solution. A catalyst such as β-picoline in acetic anhydride can also be used in this step, after which the polymer can be washed with a solvent such as methanol, filtered, and dried.

The polyimide polymer incorporates a small amount of bulky diamine, has a high molecular weight, and can readily be esterified.

Step (b)—Monoesterification Reaction

In step (b), the polyimide polymer is monoesterified to provide the monoesterified polyimide polymer. More specifically, the carboxylic acid functional groups (—COOH) of the polyimide polymer react with the hydroxyl functional groups (—OH) of the diol to convert the —COOH groups to esters. This provides a monoesterified polyimide polymer and water as a by-product. Each diol molecule contains two —OH groups. During monoesterification, only one of the —OH groups of each diol molecule reacts with a —COOH group. Ideally, the conversion of —COOH groups to esters (i.e. the ester yield) is almost 100%. However, in some cases, the ester yield can be less than 100%. Any unconverted —COOH groups can act as crosslinkable sites in a later transesterification reaction whereby monoesterified polyimide polymer chains are crosslinked.

In step (b), dehydrating conditions at least partially remove the water by-product such that the average molecular weight of the monoesterified polyimide polymer is partially maintained, fully maintained, or even increased.

Step (b) can further comprise treating the polyimide polymer with the diol in the presence of an acid catalyst to facilitate the monoesterification reaction. When the acid catalyst is present in an amount less than that typically used in conventional monoesterification reactions without water removal, the monoesterified polyimide polymer partially retains, fully retains, or even increases its molecular weight.

In some embodiments, step (a) also occurs under dehydrating conditions that at least partially remove water produced during the imidization reaction of step (a).

The monoesterified polyimide polymer with small amounts of bulky diamine maintains a relatively high average molecular weight and is mechanically strong, flexible, and can be easily and rapidly spun. The small amount of bulky diamine allows for formation of both a high molecular weight polyimide polymer and for covalent ester crosslinks via reaction of the carboxylic acid groups with a diol crosslinking agent. Upon thermal transesterification crosslinking, the fiber membrane made with a small amount of bulky diamine retains more of its fractional free volume, and hence its permeance, than fiber membrane made without bulky diamine. As such, the membrane retains good permeance and selectivity. It is believed the small amount of bulky diamine minimizes segmental motion and as such, increases sub-Tg.

Step (b) involves treating the polyimide polymer with a diol at esterification conditions in the presence of the dehydrating conditions to form a monoesterified polyimide polymer. Thus, during step (b), the polyimide polymer is subjected to monoesterification. After the imidization reaction of step (a) is complete, the reaction solution comprises the polyimide polymer, the at least one solvent, and any unreacted monomers. The diol can be directly added to the reaction solution as a crosslinking agent to form a monoesterification reaction solution. Thus, both the imidization reaction of step (a) and the monoesterification reaction of step (b) can take place in one reaction vessel or "one pot." Alternatively, the polyimide polymer can be isolated and then combined with the diol to form a monoesterification reaction solution such that the imidization reaction of step (a) and the monoesterification reaction of step (b) take place in separate reaction vessels.

The small amount of bulky diamine allows for formation of both the high molecular weight polyimide polymer, and for covalent ester crosslinks via reaction of the carboxylic acid groups with a diol crosslinking agent.

As explained above, the monoesterification reaction involves one of the —OH groups in the diol molecules reacting with the —COOH groups of the polyimide polymer to convert the —COOH groups to esters and provide the monoesterified polyimide polymer. Water is also produced as a by-product during monoesterification. Importantly, in the method as described herein, at least a portion of the water is removed from the monoesterification reaction solution by the dehydrating conditions.

Along with the diol, an acid catalyst can also be added to the reaction solution to facilitate the monoesterification reaction.

The monoesterified polyimide polymer produced by step (b) can have an average molecular weight between about 40,000 and about 400,000. In one embodiment, the monoesterified polyimide polymer has an average molecular weight between about 100,000 and about 300,000. The weight average molecular weight as described herein is measured using Gel Permeation Chromatography (GPC). The monoesterified polyimide polymer can also have a polydispersity index between about 2 and about 4.

Diol

In the present method, the length of the diol is an important consideration. If the diol is too long or too short, it can decrease the permeance and/or selectivity of a membrane formed from the monoesterified, polyimide polymer.

Diols useful in the method as described herein include ethylene glycol, propylene glycol, 1,3 propanediol, 1,4 butanediol, 1,2 butanediol, benzenedimethanol, 1,3 butanediol, and mixtures thereof. In one embodiment of the method as described herein, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3 propanediol, and mixtures thereof. In yet another embodiment, the diol is selected from the group consisting of ethylene glycol, 1,3 propanediol, and mixtures thereof. In still another embodiment, the diol is 1,3 propanediol.

Dehydrating Conditions

As with the optional dehydrating conditions of step (a), the dehydrating conditions of step (b) can result from a chemical dehydrating agent and/or a mechanical dehydrating agent. Therefore, the dehydrating conditions can be a chemical dehydrating agent alone, a mechanical dehydrating agent alone, or the combination of a chemical dehydrating agent and a mechanical dehydrating agent. It is desirable that the dehydrating conditions, whether chemical or mechanical, remove water produced during step (b) from the monoesterification reaction solution such that the concentration of water in the monoesterification reaction solution is maintained at between about 0 weight percent and about 0.08 weight percent.

If a chemical dehydrating agent is utilized, the chemical dehydrating agent does not impede the monoesterification reaction of step (b). For example, it does not decrease the monoesterification reaction rate or decrease the monoesterified, polyimide polymer yield. The chemical dehydrating agent can be an azeotropic chemical dehydrating agent or can be a carbodiimide. An azeotropic chemical dehydrating agent forms an azeotrope with the water by-product, which can be boiled out of the monoesterification reaction solution. Such azeotropic chemical dehydrating agents are well known to those of ordinary skill in the art and include ODCB, benzene, toluene, and mixtures thereof.

A carbodiimide functions as a chemical dehydrating agent by participating in the monoesterification reaction by activating the carboxylic acid functionality of the polyimide polymer toward ester formation and thereby eliminating the water by-product at the same time. This carbodiimide dehydration reaction mechanism is depicted below:

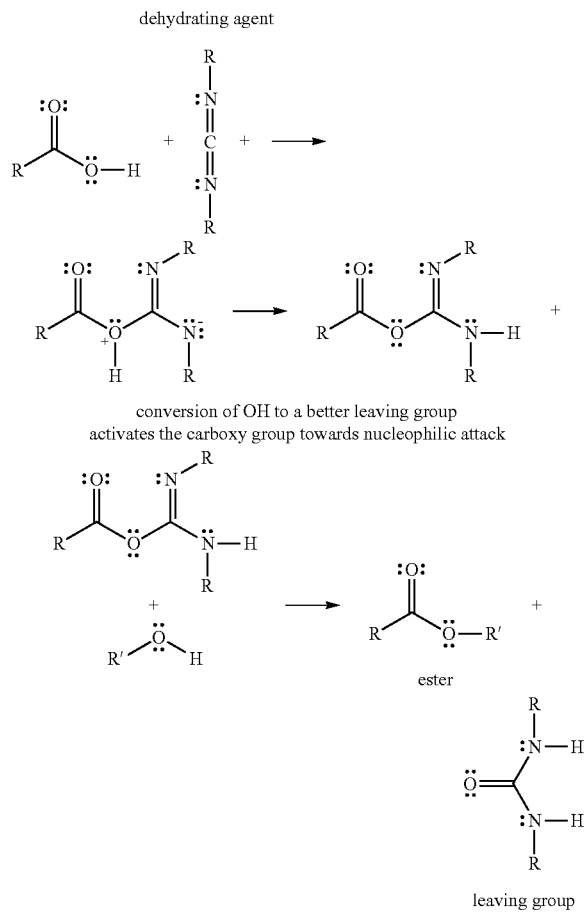

If an azeotropic chemical dehydrating agent is used as the chemical dehydrating agent, it can be used in relatively large amounts, for example, between about 1 ml to about 4 ml per gram polyimide polymer. Such a large amount of azeotropic chemical dehydrating agent ensures that the water produced by the monoesterification reaction is removed from the monoesterification reaction solution.

If a carbodiimide is used as the chemical dehydrating agent, it can be used in an amount between about 1 and about 4 times the stoichiometric amount based on the moles of water removed.

The chemical dehydrating agent can also be periodically added to the monoesterification reaction solution throughout step (b). For example, ODCB can be added periodically. According to one embodiment of the method as described herein, the chemical dehydrating agent is added to the monoesterification reaction solution in three separate batches.

As in step (a), the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized in step (a), the dehydrating conditions of step (b) can be the same as the dehydrating conditions of step (a). In fact, it is desirable for the dehydrating conditions to be the same because this simplifies the overall method as described herein. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction of step (a) can be employed in the monoesterification reaction of step (b).

Acid Catalyst

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

It has been discovered that the amount of acid catalyst present during the monoesterification reaction, under dehydrating conditions, also affects the average molecular weight of the monoesterified, polyimide polymer. More particularly, it has been discovered that when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used in the method as described herein, the amount of acid catalyst can be further reduced from the conventional amount. This is due to the fact that DABA monomers are intrinsically acidic.

Between about 0 milligrams and about 2.5 milligrams of acid catalyst can be added to the monoesterification reaction solution per gram of the polyimide polymer without experiencing undesirable molecular weight loss. In other embodiments less than 5.0 milligrams of acid catalyst can be added to the monoesterification reaction solution per gram of the polyimide polymer without experiencing undesirable molecular weight loss.

Monoesterification Conditions

The monoesterification reaction solution, with or without catalyst, is heated to a relatively high temperature over an extended period of time. Generally, the monoesterification reaction solution is heated for approximately 12-30 hours at a temperature between about 120° C. and about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

In large (volume) scale reactions, it is advantageous for both the imidization reaction of step (a) and the monoesterification reaction of step (b) to occur in the same reaction vessel. Then any dehydrating conditions remaining from the imidization reaction can easily be utilized during the monoesterification reaction.

Method of Making a Crosslinked Membrane

The method of making a crosslinked membrane as described herein comprises the following steps:

(a) preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are bulky diamino compounds;

(b) treating the polyimide polymer with a diol at esterification conditions in the presence of dehydrating conditions to form a monoesterified polyimide polymer; and (c) subjecting the monoesterified polyimide polymer to transesterification conditions to form a crosslinked membrane;

wherein the dehydrating conditions at least partially remove water produced during step (b).

In one embodiment, the crosslinked membrane is a crosslinked hollow fiber membrane. The crosslinked hollow fiber membrane is made by a method comprising the following steps:

(a) preparing a polyimide polymer comprising carboxylic acid functional groups from a reaction solution comprising monomers and at least one solvent, wherein the monomers comprise dianhydride monomers, diamino monomers without carboxylic acid functional groups, and diamino monomers with carboxylic acid functional groups and wherein 2 to 10 mole % of the diamino monomers are bulky diamino compounds;

(b) treating the polyimide polymer with a diol at esterification conditions in the presence of dehydrating conditions to form a monoesterified polyimide polymer;

(c) forming monoesterified hollow fiber from the monesterified polyimide polymer; and (d) subjecting the monesterifed hollow fiber to transesterification conditions to form a crosslinked hollow fiber membrane;

wherein the dehydrating conditions at least partially remove water produced during step (b).

In some embodiments, the monoesterified polyimide polymer incorporating a small amount of bulky diamines may not be spun into defect-free hollow fiber and may contain defects in the skin of the fiber, these defects can be sealed by coating the hollow fiber with polydimethylsiloxane (PDMS) or a cross-linked silicone coating. Accordingly, the methods as described herein may include optionally dip-coating with a layer of polydimethylsiloxane or a cross-linked silicone coating which serves to plug any defects which may have formed in the process. This is a conventional method for sealing defects. The defects can be sealed pre-crosslinking, post-crosslinking, or both pre-crosslinking and post-crosslinking. In these embodiments, the methods further comprise the step of sealing defects by coating the hollow fiber with polydimethylsiloxane (PDMS) or a cross-linked silicone coating.

The membranes made from the high molecular weight, monoesterified polyimide polymer containing a small amount of bulky diamine may take any form known in the art, for example, hollow fibers, tubular shapes, and other membrane shapes. Other membrane shapes include spiral wound membranes, pleated membranes, flat sheet membranes, and polygonal membranes. The high molecular weight, monoesterified polyimide polymer containing a small amount of bulky diamine as disclosed herein can also be cast to form sheets or films. The sheets or films can be cast onto a suitable support to provide a composite sheet. The sheets and films can be cast onto a sheet of another polymer. This polymer support can be a porous and low cost polymer. As such, this porous polymer can be used as a support for a less porous sheet or film formed from the high molecular weight, monoesterified polyimide polymer containing a small amount of bulky diamine as disclosed herein.

Steps (a) and (b)

Step (a)—Polymerization Reaction and Imidization Reaction

During steps (a) above, monomers are polymerized to form a polyamide polymer. Then, also in step (a), the polyamide polymer is converted to a polyimide polymer by means of an imidization reaction whereby amide bonds are converted to imide bonds. Step (a) involves preparing a polyimide polymer comprising carboxylic acid functional groups from a reaction solution comprising monomers and at least one solvent, as described above.

Step (b)—Monoesterification Reaction

Step (b) involves treating the polyimide polymer with a diol at esterification conditions in the presence of the dehydrating conditions to form a monoesterified polyimide polymer as described above. The monoesterified polyimide polymer contains ester groups.

The monoesterified polyimide polymer produced by step (b) can have an average molecular weight between about 40,000 and about 400,000 and in some embodiments between about 100,000 and about 300,000. It can also have a polydispersity index between about 2 and about 4.

Dehydrating Conditions

If dehydrating conditions are utilized during step (a) to remove water, the concentration of water in the reaction solution can be maintained at between about 0 weight percent and about 0.26 weight percent. Due to the dehydrating conditions of step (b), the concentration of water in the monoesterification reaction solution can be maintained at between about 0 weight percent and about 0.08 weight percent.

The dehydrating conditions can be the presence of a chemical dehydrating agent and/or a mechanical dehydrating agent.

Step (c) Transesterification Reaction

The transesterification reaction involves subjecting the monoesterified polyimide polymer to transesterification conditions to form a crosslinked membrane. In the transesterification reaction, the —OH groups in esters in one monoesterified polyimide polymer chain react with esters in another monoesterified polyimide polymer chain to form a transester or crosslink. Any unconverted —COOH groups in one monoesterified polyimide polymer chain can also react with —OH groups in esters in another monoesterified polyimide polymer chain to form a crosslink. In this manner, the transesterification reaction crosslinks the monoesterified polyimide polymer chains.

It is believed the small amount of bulky diamines reduces segmental motion or chain mobility during crosslinking and thereby reduces the large loss of permeance seen with similar crosslinked polyimide membranes, made only with dianhydride and smaller diamino monomers. Accordingly, upon thermal transesterification crosslinking, the fiber membrane made with a small amount of bulky diamine retains more of its fractional free volume, and hence its permeance, than fiber membrane made without bulky diamine.

The permeance loss, measured at 35° C. and 100 psia, from crosslinking can be, for example, around 50% and even as high as around 70% or higher, in similar crosslinked polyimide membranes that are made only with dianhydride and smaller diamino monomers. With incorporation of a small amount of bulky diamine as disclosed herein, in some embodiments, the permeance (e.g. $CO_2$ permeance) of the crosslinked membrane can be substantially maintained during crosslinking. In other words, no significant loss (i.e. less than 10%) in permeance is observed after crosslinking. In other embodiments, the permeance of the crosslinked membrane can be reduced by only 10% to 30% during crosslinking compared to the permeance of a crosslinked membrane made without the bulky diamino compounds which is reduced by at least about 50% during crosslinking. The crosslinked membrane also retains its good selectivity for separating $CO_2$ and $CH_4$. The crosslinked membrane's selectivity for separating $CO_2$ and $CH_4$ is either the same or reduced by 10% or less compared to the selectivity of a similar crosslinked polyimide membrane made with dianhydride and smaller diamino monomers.

The crosslinked membrane is suitable for separating fluid mixtures, including both gaseous mixtures and liquid mixtures.

Transesterification Conditions

Typical transesterification conditions are known in the art. Generally, transesterification can be accomplished by heating the monoesterified polyimide polymer. Heating initiates the transesterification reaction and, additionally, removes residual solvent.

The monoesterified, polyimide polymer can be heated to crosslink at a temperature of about 150° C. or higher under vacuum. In one embodiment, the monoesterified, polyimide polymer is heated to crosslink at a temperature of about 180° C. or higher under vacuum. In another embodiment, the monoesterified, polyimide polymer is heated to crosslink at a temperature of about 200° C. or higher under vacuum. For example, the monoesterified hollow fibers can be heated under vacuum at 200° C. for approximately 2 hours and cooled under vacuum for approximately 6 hours. Higher temperatures result in a greater degree of crosslinking. However, temperatures of about 300° C. or higher may damage the skin layer of a crosslinked hollow fiber membrane made according to the method as described herein. The small amount of bulky diamines can increase the sub-Tg above the temperature at which crosslinking is performed.

Transesterification can also be accomplished by UV or microwave treatment. Furthermore, transesterification reactions can be catalyzed. Transesterification catalysts can be the same acid catalysts used during monoesterification, which include para-toluene sulfonic acid, sulfuric acid, methanesulfonic acid, triflic acid, and mixtures thereof.

Crosslinked Hollow Fiber Membranes

The crosslinked hollow fiber membrane is comprised of individual fibers of crosslinked polyimide polymer chains.

In the method for forming crosslinked hollow fiber membranes, step (c) involves forming monoesterified hollow fiber from the monoesterified polyimide polymer by spinning the monoesterified polyimide polymer. The monoesterified polyimide polymer can be spun into monoesterified hollow fibers at high take-up rates. To make such monoesterified hollow fiber, the monoesterified polyimide polymer can be incorporated into a spinning dope, which is spun into monoesterified hollow fiber by means of a spinning process such as a wet-quench/dry-jet spinning process. While a wet-quench/dry-jet spinning process is discussed in detail below, it should be appreciated that other types of spinning methods (e.g. wet spinning) can be used to form the monoesterified hollow fiber.

The monoesterified hollow fiber formed in step (c) contains monoesterified polyimide polymer, which contains ester groups. Because the monoesterified polyimide polymer includes a small amount of bulky diamines, the monoesterified hollow fiber formed from such polymer exhibits selectivity and retains its good permeance.

In step (d), a crosslinked hollow fiber membrane is formed from the monoesterified hollow fiber. In step (d), —OH groups in esters in one monoesterified polyimide polymer chain within a fiber react with esters in another monoesterified polyimide polymer chain within the same fiber to form a transester or crosslink.

The permeance loss from crosslinking can be, for example, around 50% and even as high as around 70% or higher, in similar crosslinked polyimide membranes that are made only with dianhydride and smaller diamino monomers.

Without being bound by theory, it is believed the decrease in permeance observed upon crosslinking in the absence of bulky diamines is a result of collapse of the transition layer just below the skin layer of the hollow fibers, which in turn results from segmental motion and rotation of groups in the polymer chains, and leads to a thicker skin layer. In contrast, it is believed hollow fibers made from polyimide polymer containing bulky diamines exhibit a reduced increase in skin layer thickness upon crosslinking. For example, the hollow fibers may exhibit an increase in skin layer thickness between about 25% and about 100% or between about 50% and about 100%.

With incorporation of a small amount of bulky diamine as disclosed herein, in some embodiments, the permeance (e.g., $CO_2$ permeance) of the crosslinked membrane can be substantially maintained during crosslinking. In other words, no significant loss (i.e. less than 10%) in permeance is observed after crosslinking. For example, it has been discovered that hollow fiber spun from PDMC can lose about 50% of its $CO_2$ permeance (at 35° C. and 100 psia) from crosslinking. In contrast, hollow fiber spun from PDMC containing 5 mol % CF3 can substantially maintain its $CO_2$ permeance after crosslinking. For example, hollow fiber spun from PDMC containing 5 mol % CF3 can substantially maintain $CO_2$ permeance (measured at 35° C. and 100 psia) at between about 90 and 175 GPU or at between about 100 and 170 GPU after crosslinking, when the fibers are post-treated after crosslinking with PDMS.

In other embodiments, the permeance of the crosslinked membrane can be reduced by only 10% to 30% during crosslinking compared to the permeance of a crosslinked membrane made without the bulky diamino compounds which is reduced by at least about 50% during crosslinking.

The crosslinked membrane also retains its good selectivity for separating $CO_2$ and $CH_4$. The crosslinked membrane's selectivity is either the same or reduced by 10% or less compared to the selectivity of a similar crosslinked polyimide membrane made with dianhydride and smaller diamino monomers. For example, hollow fiber spun from PDMC containing 5 mol % CF3 that is subsequently crosslinked and then post-treated with PDMS can exhibit, at 35° C. and 100 psia, pure-gas selectivity ($CO_2/CH_4$) between about 25 and about 65 or between about 25 and about 50. It is noted that this is for fibers with minor defects, which is why the post-treatment with PDMS is utilized. For defect-free fibers, post-treating is not required to get to a selectivity of 25 or greater.

In summary, the crosslinked hollow fiber membrane exhibits the same or similar selectivity and better permeance than crosslinked hollow fiber membranes made from monoesterified polyimide polymers without bulky diamines.

Spinning Dope to Form Monoesterified Hollow Fiber

The spinning dope is a homogeneous one phase solution and can comprise the monoesterified polyimide polymer, a volatile component, an optional inorganic additive, a spinning solvent, and a spinning non-solvent.

Polymer concentration is a matter of concern. Sufficient polymer must be present to form strong fibers and membranes capable of withstanding high pressures. However, too much polymer increases resistance in the membrane substructure and adversely affects membrane performance. In one embodiment of the method as described herein, the monoesterified polyimide polymer is present in the spinning dope in an amount between about 20 and about 50 weight percent. In another embodiment, the monoesterified polyimide polymer is present in the spinning dope in an amount between about 25 and about 45 weight percent. In yet another embodiment, the monoesterified polyimide polymer is present in the spinning dope in an amount between about 30 and about 40 weight percent.

The volatile component can be an organic solvent with a specified room temperature vapor pressure and a specified boiling point. Such an organic solvent aids in the formation of the dense skin separation layer of the hollow fiber. It effectively and efficiently evaporates during the dry-jet step of the wet-quench/dry-jet spinning process and evaporation on the outside of the nascent fiber is believed to help keep the polymer chains more entangled and at a higher concentration, which promotes vitrification and formation of the dense skin. The specified room temperature vapor pressure of the organic solvent can be greater than about 0.05 bar. Alternatively, the specified room temperature vapor pressure can be greater than about 0.1 bar. As another alternative, the specified room temperature vapor pressure can be greater than about 0.2 bar. The specified boiling point of the organic solvent can be between about 30° C. and about 100° C. Alternatively, the specified boiling point can be between about 40° C. and about 90° C. As another alternative, the specified boiling point can be between about 50° C. and about 70° C.

Exemplary organic solvents include tetrahydrofuran (THF) and acetone. In one embodiment of the method as described herein, the volatile component is present in the spinning dope in an amount between about 5 and about 25 weight percent. In another embodiment, the volatile component is present in the spinning dope in an amount between about 5 and about 20 weight percent. In yet another embodiment, the volatile component is present in the spinning dope in an amount between about 10 and about 15 weight percent.

The optional inorganic additive can enhance phase separation, increase substructure porosity, and increase viscosity of the spinning dope. Since the monoesterified, polyimide polymer has a large quantity of carboxyl functional groups, it is more hydrophilic than most traditional polymers used in spinning processes. Therefore, it takes a longer time for the monoesterified polyimide polymer to separate during the wet-quench step. The optional inorganic additive reduces the time necessary for phase separation of the monoesterified polyimide polymer.

The optional inorganic additive can be an antilyotropic salt. As defined herein, the term "antilyotropic salt" refers to a salt that interacts with solvent molecules rather than polymer molecules. See Ekiner O. M. et al., *Journal of Membrane Science* 53 (1990) 259-273. Exemplary antilyotropic salts include $LiNO_3$, $LiClO_4$, $MgCl_2$, $ZnCl_2$, and NaI.

Concentration of the inorganic additive is also a matter of concern. While the inorganic additive can reduce the time required for phase separation, it is believed that excess inorganic additive (e.g. $LiNO_3$) can cause defect formation if the porosity extends into the non-vitrified skin layer of the hollow fiber. In one embodiment of the method as described herein, the concentration of antilyotropic salt in the spinning dope is between about 0 and about 10 weight percent. In another embodiment, the concentration of the antilyotropic salt in the spinning dope is between about 2 and about 8 weight percent. In yet another embodiment, the concentration of the antilyotropic salt in the spinning dope is between about 4 and about 7 weight percent.

The spinning solvent can be a high boiling organic solvent. Exemplary high boiling organic solvents are listed in Table 1 above, along with their normal boiling points. A high boiling organic solvent that has a high affinity for water can enhance phase separation of the hollow fiber in the wet-quench step of the spinning process. NMP is a particularly desirable spinning solvent because it dissolves many polymers used in spinning, is relatively benign compared to other spinning solvents, and has a high affinity for water. The concentration of the spinning solvent can be dependent upon many factors, including the molecular weight of the monoesterified polyimide polymer, the polydispersity index of the monoesterified polyimide polymer, and the other components of the spinning dope, and can be determined by the precipitation method discussed below. The concentration of the spinning solvent can be, for example, between about 25 and about 35 weight percent.

The spinning non-solvent can be an alcohol, such as an aliphatic alcohol, or water. In one embodiment of the method as described herein, the spinning non-solvent is a lower boiling aliphatic alcohol, for example, methanol or ethanol. The normal boiling points of methanol and ethanol are 64.7° C. and 78.4° C., respectively. Some spinning non-solvents (e.g. ethanol) can also serve as an additional volatile component. The concentration of the spinning non-solvent is directly dependent upon the spinning solvent concentration and can also be determined by the precipitation method discussed below. The concentration of the spinning non-solvent can be, for example, between about 15 and about 25 weight percent.

The concentrations of spinning solvent and spinning non-solvent can be determined by an iterative precipitation method wherein the concentrations of the spinning solvent and the spinning non-solvent are dependent upon the respective concentrations of the monoesterified polyimide polymer, the volatile component, and the optional inorganic additive. Such precipitation method ensures that the spinning dope is a homogeneous one-phase solution, but is still close to the point of precipitation in order to reduce the phase separation time during the wet-quench step.

According to the precipitation method, the concentrations of the monoesterified polyimide polymer, the volatile component, and the optional inorganic additive are set. Initial concentrations of the spinning solvent and the spinning non-solvent are then chosen. The components, in these concentrations, are combined in a small sample vial. First, the volatile component, the spinning solvent, and the spinning non-solvent are mixed to form a solution. Next, the optional inorganic additive is added to the solution. After the optional inorganic additive dissolves in the solution, the monoesterified polyimide polymer is added to the solution to provide a spinning dope sample. The polymer can be added in batches to facilitate dispersion of the polymer throughout the solution. If the polymer precipitates out, the spinning solvent concentration is increased anywhere between about 0 weight percent and about 5 weight percent to arrive at the final spinning solvent concentration. The spinning non-solvent concentration is similarly decreased to arrive at the final spinning non-solvent concentration. If the polymer does not precipitate out, the concentration of the spinning solvent and/or the spinning non-solvent is altered and the precipitation test is repeated. Iterations occur until final concentrations are obtained that provide a homogeneous one-phase spinning dope close to the point of precipitation.

A larger amount of spinning dope can be prepared according to these final concentrations. It is advantageous to carry out the precipitation method with small sample amounts of spinning dope before spinning any batch of the spinning dope because the point of precipitation can vary as the structure and/or average molecular weight of the polymer varies.

Dry-Jet/Wet-Quench Spinning Process to Form Monoesterified Hollow Fiber

If a dry-jet/wet-quench spinning process is used to spin the high molecular weight, monoesterified polyimide polymer into hollow fibers, several benefits can be realized. First, the hollow fibers can be spun at higher take-up rates. Second, the dry-jet step can increase chain entanglement, which hypothetically forms skin on the hollow fibers. Third, the high molecular weight polymer can increase dope viscosity, which allows the spinning dope to be spun at elevated dope temperatures. Such elevated dope temperatures are required for evaporative skin formation.

Dry-jet/wet-quench spinning processes are well known in the art. Generally, in a dry-jet/wet-quench spinning process, spinning dope comprising a polymer is extruded into filaments through orifices of a spinneret, which is separated from a coagulating bath by a gaseous layer or non-coagulating liquid. The filaments are passed through the gaseous layer, such as air, or non-coagulating liquid, such as toluene or heptane, and then conducted into a coagulating bath. Conveyance of the filaments through the gaseous layer is commonly referred to as the dry-jet step. The coagulating bath can be an either an aqueous system, such as pure water, or a non-aqueous system, such as methanol. Conveyance of the filaments through the coagulating bath is commonly referred to as the wet-quench step. After the filaments leave the coagulating bath, they can be washed. Washing is especially important if the coagulating bath contains any acid and can be accomplished with water alone or combinations of alkaline solutions and water. The filaments are dried and wound on a rotating drum. They can be air dried on the drum or the drum can be heated to facilitate drying.

According to an embodiment of the method of making the crosslinked hollow fiber membrane as described herein, a monoesterified polyimide polymer is extruded through orifices of a spinneret to provide a hollow fiber. This hollow fiber is conveyed through a gaseous layer of air and through a coagulating bath of de-ionized water. The fibers exit the de-ionized water bath and are wound around a take-up drum.

The take-up drum can be partially contained in a vessel of room temperature de-ionized water in order to keep the fiber wet. The fiber can be left on the take-up drum for between about 10 minutes and about 20 minutes and then cut into strands and left in another de-ionized water bath for between about 2 days and about 3 days. The de-ionized water baths help remove solvent from the fiber. The fibers can then be dehydrated by fluid exchange with non-solvents of decreasing surface tension, for example, ethanol and hexane. Ultimately, the fibers can be air-dried and/or oven-dried.

According to the method as described herein, the spinneret orifices can have smaller dimensions than those used in conventional spinning processes. Smaller spinneret dimensions permit spinning of hollow fibers under normal conditions into fibers useful for making membranes that can be used under high pressure conditions (i.e. fibers with a diameter of less than 300 microns). The smaller spinneret dimensions also improve mixing in the spinneret and shearing during extrusion. Further, the smaller spinneret dimensions increase the extrusion velocity and consequently decrease the draw ratio (i.e. the take-up rate divided by the extrusion rate). Reduced draw ratios are desirable because excessively high draw ratios can induce high orientation/elongation stresses, which may be detrimental during further processing like crosslinking. For example, it was found that when hollow fibers were spun with a spinneret having larger dimensions, high draw ratios had to be applied to achieve fibers of reasonable dimensions (less than 300 microns) and these fibers became defective after crosslinking.

The annular diameter of the spinneret orifices can be approximately half the size of conventional spinneret orifices. For example, the annular diameter can be between about 600 microns and about 1300 microns and the bore needle outer diameter can be between about 300 microns and about 700 microns.

The draw ratio can be less than 150. Alternatively, the draw ratio can be less than 100. As another alternative, the draw ratio can be less than 50. As still another alternative, the draw ratio can be less than 10.

The distance between the point of extrusion out of the spinneret and the surface of the de-ionized water bath is referred to herein as the "air gap height." The air gap height must be greater than 0 cm. The air gap height can be between about 1 cm and about 5 cm. Alternatively, the air gap height can be between about 1 cm and about 10 cm. As another alternative, the air gap height can be between about 1 cm and about 20 cm. Larger air gap heights favor skin formation.

Similarly, relatively high spinning dope temperatures (i.e. the temperature of the spinning dope just before extrusion through the spinneret) favor skin formation. The spinning dope temperature can be greater than 40° C. Alternatively, the spinning dope temperature can be greater than 50° C. As yet another alternative, the spinning dope temperature can be greater than 60° C.

As stated above, according to one embodiment, the coagulating bath contains de-ionized water. A sufficiently high coagulating bath temperature ensures adequate phase separation in the coagulating bath. If phase separation is inadequate, the fibers will be crushed in the first guide roll after extrusion. The coagulating bath temperature can be between about 10° C. and about 70° C. Alternatively, the coagulating bath temperature can be between about 25° C. and about 60° C. As another alternative, the coagulating bath temperature can be between about 40° C. and about 50° C.

The take-up rate (i.e. the speed at which the hollow fibers are wound around the take-up drum) can be much greater than take-up rates used when spinning low molecular weight polymers. This is due to the fact that the high molecular weight polymers as described herein can withstand the greater stresses associated with higher take-up rates. The take-up rate can be increased with a fixed extrusion rate if a smaller diameter fiber is required. Take-up rates between about 20 m/min and about 150 m/min (e.g. between about 20 m/min and about 70 m/min) are achievable according to the method as described herein.

The face velocity of air surrounding the spinneret can be greater than 50 ft/min. Alternatively, the face velocity of air surrounding the spinneret can be greater than 80 ft/min. As another alternative, the face velocity of air surrounding the spinneret can be greater than 100 ft/min.

Method of Using the Membranes

A mixture containing gases to be separated can be enriched by passing the gas mixture through the membrane as disclosed herein. Such gas mixture to be enriched can originate from a hydrocarbon well such as an oil or gas well including an offshore well. It is also possible to enrich a mixture of liquids to be separated by passing the liquid mixture through the membrane as disclosed herein.

For example, the crosslinked membrane can be used to separate gases by:

(a) providing a feed stream selected from the group consisting of air, a mixture of methane and nitrogen, a mixture of methane and hydrogen, a mixture of methane and hydrogen sulfide, a refinery stream, a mixture of carbon dioxide and methane, and syngas, the feed stream including a gaseous component selected from the group consisting of nitrogen, oxygen, hydrogen, hydrogen sulfide and carbon dioxide;

(b) maintaining a pressure differential between an upstream side of the membrane and a downstream side of the membrane;

(c) contacting the upstream side of the membrane with the feed stream at a pressure between about 20 psia and about 4000 psia;

(d) isolating a permeate stream on the downstream side of the membrane having a larger mole fraction of the faster permeating component of the feed stream; and (e) isolating a retentate stream having a smaller mole fraction of the faster permeating component of the feed stream.

In one embodiment, the membrane can be a crosslinked hollow fiber membrane.

The feed stream can be enriched in the gaseous component at a temperature between about 25° C. and 200° C. In one embodiment, the feed stream is measured at a temperature of 35° C. The feed stream can be at a pressure from about 50 psia to about 4000 psia. As another alternative, the feed stream can be at a pressure from about 100 psia to about 1000 psia or from about 200 psia to about 100 psia. In one embodiment, the feed stream is measured at a pressure of 100 psia or 200 psia. The temperature of the feed stream can be its temperature as produced from a hydrocarbon well (e.g. a oil or gas well including an offshore well). These conditions can be varied using routine experimentation depending on the feed streams. The downstream side of the membrane can be maintained as a vacuum.

A variety of gas mixtures can be purified with the membrane as disclosed herein. For example, applications include enrichment of air by nitrogen and oxygen, carbon dioxide removal from methane streams, hydrogen sulfide removal from methane streams, nitrogen or hydrogen removal from methane streams, or carbon monoxide from syngas streams. The membrane can also be used in hydrogen separation from refinery streams and other process streams, for example from the dehydrogenation reaction effluent in the catalytic dehydrogenation of paraffins. Generally, this membrane may be used in any separation process with gas mixtures involving, for example, hydrogen, nitrogen, methane, hydrogen sulfide, carbon dioxide, carbon monoxide, helium, and oxygen.

If additional purification is required, the product in the permeate stream can be passed through additional membranes, and/or the product can be purified via distillation using techniques well known to those of skill in the art. Typically, membrane systems may consist of many modules connected in various configurations. See, for example, Prasad et al., *J. Membrane Sci.*, 94, 225-248 (1994), the contents of which are incorporated by reference herein in their entirety for background and review. Modules connected in series offer many design possibilities to purify the feed, permeate, and residue streams to increase the separation purity of the streams and to optimize the membrane system performance.

Separation Systems Including the Membranes

Membranes as disclosed herein can be used in separation systems like those discussed in U.S. Pat. Nos. 6,932,859 and 7,247,191, which are incorporated herein by reference in their entirety.

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes.

Hollow fibers as described herein can be employed in bundled arrays potted at either end to form tube sheets and fitted into a pressure vessel thereby isolating the insides of the tubes from the outsides of the tubes.

The following examples are provided as specific illustrations, and are not meant to be limiting.

EXAMPLE 1

Sample Preparation:

A 2-5 wt % solution of the given polymer in THF (basically 2 g polymer in 50 mL THF for film with the area of 7 inch$^2$. In this case, the film thickness would be about 120-180 um) was prepared by stirring the mixture for overnight, and filtered through a 0.2 um syringe filter to remove the nondissolved materials and dust particles. The solution was then poured into a casting ring on a leveled clean glass plate. The casting films were dried in an oven for 12 h at room temperature, and the film samples were dried under vacuum for 2 h at 70° C. overnight in order to ensure complete removal of solvent. (make sure the thickness of film is more than 50 um, 150-200 um is best for DMA testing)

For the DMA testing, the film was cut into small pieces with length of 30 mm and width of 6.5 mm.

Dynamic Mechanical Analysis.

Dynamic mechanical properties refer to the response of a material as it is subjected to a periodic force. These properties may be expressed in terms of a dynamic modulus, a dynamic loss modulus, and a mechanical damping term. The viscoelastic property of a polymer is studied by dynamic mechanical analysis where a sinusoidal force (stress σ) is applied to a material and the resulting displacement (strain) is measured. The storage modulus measures the material's ability to store elastic energy, representing the elastic portion. The storage modulus, E', is the measure of the sample's elastic behavior. The ratio of the loss to the storage is the tan delta and is often called damping. It is a measure of the energy dissipation of a material. Amorphous polymers have different glass transition temperatures, above which the material will have rubbery properties instead of glassy behavior and the stiffness of the material will drop dramatically with an increase in viscosity. At the glass transition, the storage modulus decreases dramatically and the loss modulus reaches a maximum. Temperature-sweeping DMA is used to characterize the glass transition temperature of a material.

For this study, the dynamic mechanical data was recorded on a TA Q800 DMA (TA instruments) in tensile geometry. Two major kinds of test modes can be used to probe the viscoelastic properties of polymers: temperature sweep and frequency sweep tests. A common test method involves measuring the complex modulus at low constant frequency while varying the sample temperature. Herein, a simultaneous temperature sweep mode was used. The discrete frequency was set to 1 Hz, while the furnace heated at 3° C./min from 35 to 400° C. These measurements were recorded on a TA Q800 DMA.

A prominent peak in tan (δ) appears at the glass transition temperature of the polymer which is detected as a sudden and considerable (several decades) change in the elastic modulus and an attendant peak in the tan δ curve. Secondary transitions can also be observed, which can be attributed to the temperature-dependent activation of a wide variety of chain motions. Some authors have also called these types of transitions second order transitions to differentiate them from the primary transitions of Tg,[1] which involve large sections of the main chains. The sub-Tg is not always an indicator of toughness.[2] This transition can be considered the "activation barrier" for solid-phase reactions, deformation, flow or creep, acoustic damping, physical aging changes, and gas diffusion into polymers as the activation energies for the transition and these processes are usually similar.[3] The strength of these transitions is related to how strongly a polymer responds to those processes. These sub-Tg transitions are associated with the materials properties in the glassy state.

REFERENCES

1. C. L. Rohn, Analytical Polymer Rheology, Hanser-Gardener, New York (1995). J. Heijboer, Intl. J. Polym. Mater., 6, 11 (1977).
2. R. Boyer, Polym. Eng. Sci., 8 (3), 161 (1968).
3. V. Bershtien, V. Egorov, Differential Scanning Calorimetery in the Physical Chemistry of Polymers, Ellis Horwood, Chichester (1993).

Figure 2:
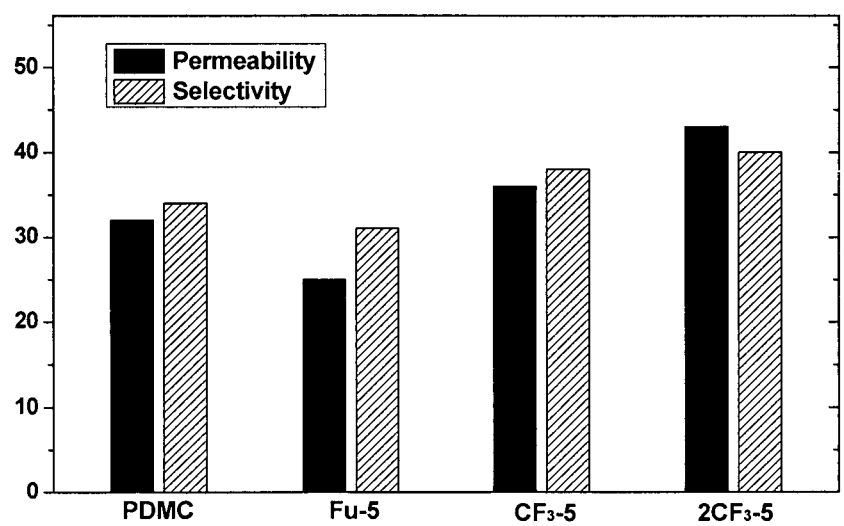
FIG. 2 provides a graph of permeability ($CO_2$) and selectivity ($CO_2/CH_4$) of these crosslinked polymers at 35° C. and approximately 100 psi.

As can be seen in FIG. 1, the sub-Tg of the PDMC (propane diol monoester crosslinked polymer), and for the three polymers: PDMC containing 5 mol % Fu, PDMC containing 5 mol % CF3 and PDMC containing 5 mol % 2CF3 are about 150° C., 195° C., 240° C. and 255° C., respectively. FIG. 2 provides a graph of permeability ($CO_2$) and selectivity ($CO_2/C_4$) of these crosslinked polymers at 35° C. and approximately 100 psi.

EXAMPLE 2

Vacuum dried monomers (16.62 grams DAM, 12.24 grams DABA, and 1.77 grams CF3 diamine) were dissolved in 60 wt % NMP. To this was added 89.37 grams of 6FDA dianhydride dissolved in 40 wt % NMP, to give a molar ratio of: 5.5 6FDA-DAM: 0.5 CF3: 4 DABA.

This mixture was allowed to polycondense for 24 hours under a nitrogen purge at room temperature to give a polyamide polymer.

EXAMPLE 3

To the polyamide in NMP of Example 2 was added 21.0 ml of β-picoline as a catalyst along with 186.3 ml of acetic anhydride. The polymer was allowed to imidize for 24 hours under a nitrogen purge at room temperature to give a polyimide polymer. The polyimide was methanol washed and filtered. It was then dried at room temperature for eight hours and then at 210° C. for 24 hours.

EXAMPLE 4

60 grams of the polyimide polymer from Example 3 and 390 grams of NMP were mixed and heated to about 100° C. 150 ml of toluene was added as a dehydrating agent, and the mixture heated to about 130° C. Then 0.3 grams of p-toluenesulfonic acid (p-TSA) were added as a catalyst. Then 202 ml of 1,3-propanediol were slowly added, and the polymer allowed to esterify under a nitrogen purge at about 130° C. for 24 hours. The mixture was then cooled to around 50° C. and the polymer precipitated in 50/50 vol % methanol/water. The monoesterified polymer was then washed with methanol/water, filtered, and dried for 12 hours at room temperature and 24 hours at 70° C.

EXAMPLE 5

A spinning dope containing the monoesterified polymer of Example 4 was prepared. This was used to spin hollow fibers. The fibers were tested with a mixed gas of 50/50 vol % $CO_2/CH_4$ at 200 psi and 35° C., with shell side feed. The $CO_2$ permeance was about 115 GPU with a $CO_2/CH_4$ selectivity of 22.

EXAMPLE 6

Fibers of Example 5 were crosslinked at 200° C. under vacuum, and then tested with a mixed gas of 50/50 vol % $CO_2/CH_4$ at 200 psi and 35° C. with shell side feed. The $CO_2$ permeance was about 110 GPU with a $CO_2/CH_4$ selectivity of 23, showing a $CO_2$ permeance loss of only 4-8%.

EXAMPLE 7

Figure 3:
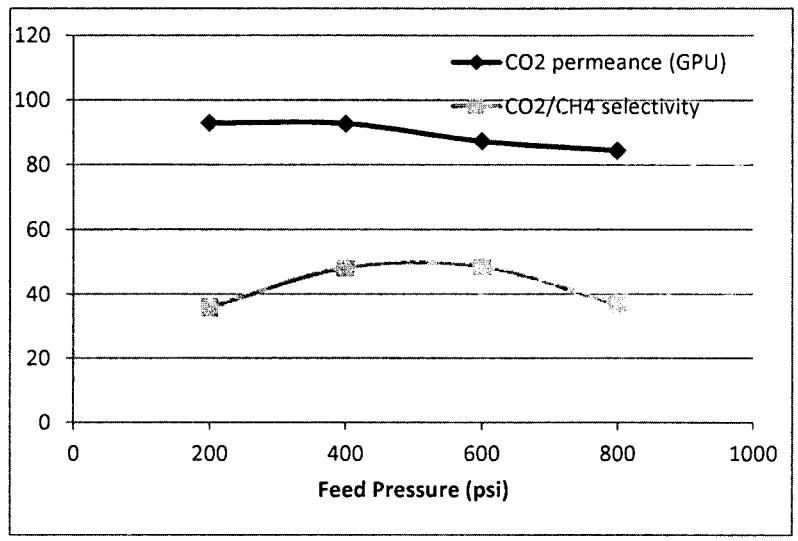
FIG. 3 shows $CO_2$ permeance of crosslinked fibers prepared similar to those of Example 6 and coated with PDMS and vacuum dried for two hours at 200° C. The $CO_2$ permeance was tested with a 50/50 vol % $CO_2/CH_4$ mixed gas at 35° C. with shell side feed at pressures between 200 and 800 psi.

Crosslinked fibers prepared similar to those of Example 6 were coated with PDMS and vacuum dried for two hours at 200° C., then tested with a 50/50 vol % $CO_2/CH_4$ mixed gas at 35° C. with shell side feed at pressures between 200 and 800 psi. FIG. 3 shows that the $CO_2$ permeance stayed in the range of about 92-105 GPU, with $CO_2/CH_4$ selectivity in the range 41-50.

EXAMPLE 8

Another spinning dope of the polymer of Example 4 was prepared and used to spin hollow fibers. These fibers were tested with a mixed gas of 50/50 vol % $CO_2/CH_4$ at 200 psi and 35° C. with shell side feed. The $CO_2$ permeance was about 62 GPU with a $CO_2/CH_4$ selectivity of 38, considerably higher than in Example 5, showing the fibers to be defect-free.

EXAMPLE 9

Fibers of Example 8 were crosslinked at 200° C. under vacuum, and then tested with a mixed gas of 50/50 vol % $CO_2/CH_4$ at 200 psi and 35° C. with shell side feed. The $CO_2$ permeance was about 61 GPU with a $CO_2/CH_4$ selectivity of 34, showing no $CO_2$ permeance loss.

EXAMPLE 10

Figure 4:
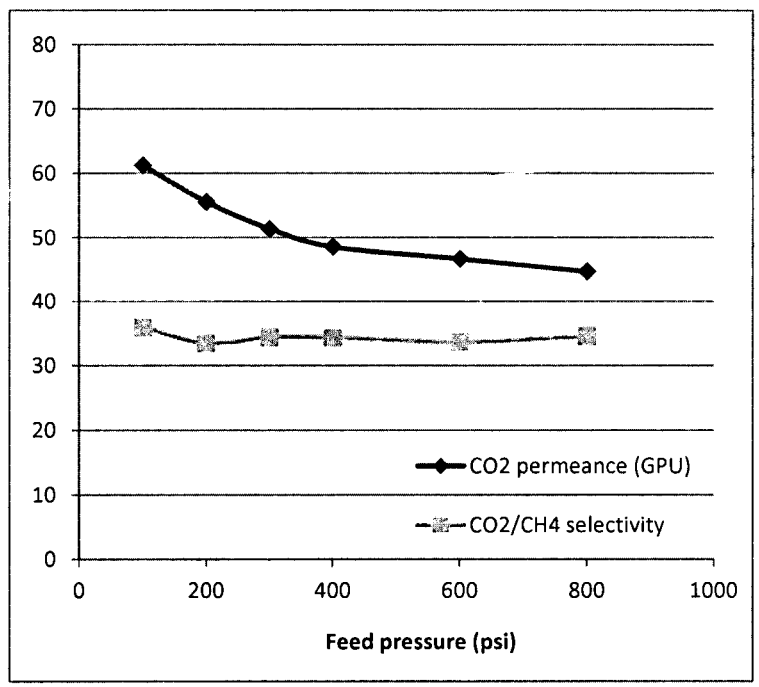
FIG. 4 shows $CO_2/CH_4$ selectivity for the crosslinked fibers of Example 9. The $CO_2/CH_4$ selectivity was tested with a 50/50 vol % $CO_2/CH_4$ mixed gas at 35° C. and shell side feed at pressures between 200 and 800 psi.

Crosslinked fibers of Example 9 were tested with a 50/50 vol % $CO_2/CH_4$ mixed gas at 35° C. and shell side feed at pressures between 200 and 800 psi. FIG. 4 shows that the $CO_2/CH_4$ selectivity stayed in the range 33-37.

Although the methods as described herein have been described in connection with certain embodiments thereof, it will be appreciated by those skilled in the art that additions, deletions, modifications, and substitutions not specifically described may be made without departing from the spirit and scope of the methods as defined in the appended claims.

What is claimed is:
1. A method for making a high molecular weight, monoesterified polyimide comprising:
(a) preparing a polyimide comprising carboxylic acid functional groups from a reaction solution comprising monomers and at least one solvent, wherein the monomers comprise (i) a dianhydride monomer, (ii) a diamino monomer without carboxylic acid functional groups, (iii) a diamino monomer with carboxylic acid functional groups, and (iv) a bulky diamino compound different from diamino monomers (ii) and (iii), wherein 2 to 10 mole % of the total diamino monomers compise the bulky diamine compound; and
(b) treating the polyimide with a diol at esterification conditions in the presence of dehydrating conditions to form a monoesterified polyimide,
wherein the dehydrating conditions at least partially remove water produced during step (b).
2. The method of claim 1, wherein the monomers comprise:
(a) a dianhydride monomer A of formula (I):

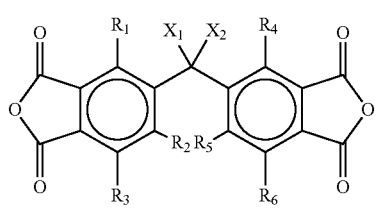

where $X_1$ and $X_2$ are independently halogenated alkyl, phenyl or halogen; and $R_1$, $R_2$, $R_3$, $R_4$, $R_5$, and $R_6$ are independently H, alkyl, or halogen;
(b) a diamino monomer without carboxylic acid functional groups B;
(c) a diamino monomer with carboxylic acid functional groups C; and
(d) a bulky diamino compound D different from diamino monomers B and C;
wherein 2 to 10 mole % of the total diamino monomers comprise the bulky diamino compound D.
3. The method of claim 2, wherein A is 4,4'-(hexafluoroisopropylidene) diphthalic anhydride (6FDA), B is 2,4,6-trimethyl-m-phenylenediamine (DAM), and C is 3,5-diaminobenzoic acid (DABA).
4. The method of claim 3, wherein the bulky diamino compound D comprises 2,2$^1$-bis(trifluoromethyl)benzidine (2CF3), 5-(trifluoromethyl)-1,3-phenylenediamine, or 4,4'-(9-fluorenylidene)dianiline (CF3).
5. The method of claim 4, wherein 2 to 5 mole % of the total diamino monomers comprise the bulky diamino compound D.
6. The method of claim 1, wherein the monoesterified polyimide has an average molecular weight of 100,000 to 300,000 as measured by Gel Permeation Chromatography.
7. The method of claim 1, wherein the concentration of water in a solution comprising the polyimide and the diol in step (b) is maintained at between about 0weight percent and about 0.08 weight percent.
8. The method of claim 1, wherein step (b) further comprises treating the polyimide with the diol in the presence of an acid catalyst.
9. A method of making a crosslinked membrane, comprising:
(a) preparing a polyimide comprising carboxylic acid functional groups from a reaction solution comprising monomers and at least one solvent, wherein the monomers comprise (i) a dianhydride monomer, (ii) a diamino monomer without carboxylic acid functional groups, (iii) a diamino monomer with carboxylic acid functional groups, and (iv) a bulky diamino compound different from diamino monomers (ii) and (iii) , wherein 2 to 10 mole % of the total diamino monomers comprise the bulky diamine compound;
(b) treating the polyimide with a diol at esterification conditions in the presence of dehydrating conditions to form a monoesterified polyimide; and
(c) subjecting the monoesterified polyimide to transesterification conditions to form a crosslinked membrane;
wherein the dehydrating conditions at least partially remove water produced during step (b).
10. The method of claim 9, wherein the crosslinked membrane formed in step (c) exhibits a $CO_2$ permeance of at least 20 GPU and a $CO_2/CH_4$ selectivity of greater than 20, measured at 35° C. and a pressure of 100 psia.
11. The method of claim 9, wherein the crosslinked membrane formed in step (c) exhibits a $CO_2$ permeance of at least 40 GPU and a $CO_2/CH_4$ selectivity of greater than 20, measured at 35° C. and a pressure of 100 psia.
12. The method of claim 9, wherein the crosslinked membrane is a crosslinked hollow fiber membrane and the method further comprises forming a monesterified hollow fiber from the monesterified polyimide.
13. The method of claim 12, wherein the forming step comprises spinning the monoesterified hollow fiber from a spinning dope comprising the monoesterified polyimide, a volatile component, a spinning solvent, a spinning nonsolvent, and optionally an inorganic additive.

14. The method of claim 13, wherein the monoesterified polyimide is present in the spinning dope in an amount between about 20 and about 50 weight percent.

15. The method of claim 13, wherein the volatile component is present in the spinning dope in an amount between about 5 and about 25 weight percent.

16. The method of claim 12, wherein 10% to 30% loss in permeance, measured at 35° C. and a pressure of 100 psia, is observed after subjecting the monesterified hollow fiber to transesterification conditions to form the crosslinked hollow fiber membrane.

17. The method of claim 12, wherein less than 10% loss in permeance, measured at 35° C. and a pressure of 100 psia, is observed after subjecting the monesterified hollow fiber to transesterification conditions to form the crosslinked hollow fiber membrane.

18. The method of claim 9, wherein the dianhydride monomer is 4,4'-(hexafluoroisopropylidene) diphthalic anhydride (6FDA), the diamino monomer without carboxylic acid functional groups is 2,4,6-trimethyl-m-phenylenediamine (DAM), and the diamino monomer with carboxylic acid functional groups is 3,5-diaminobenzoic acid (DABA).

19. The method of claim 18, wherein the bulky diamino compound comprises 2,2'-bis(trifluoromethyl)benzidine (2CF3), 5-(trifluoromethyl)-1,3-phenylenediamine, or 4,4'-(9-fluorenylidene)dianiline (CF3).

20. The method of claim 19, wherein the monoesterified polyimide has an average molecular weight of 100,000 to 300,000 as measured by Gel Permeation Chromatography.

21. The method of claim 19, wherein 2 to 5 mole % of the total diamino monomers comprise the bulky diamino compound.

22. The method of claim 9, wherein the bulky diamino compound does not crosslink when subjected to transesterification conditions to form a crosslinked membrane in step (c).

23. The method of claim 9, wherein selectivity of the crosslinked membrane for separating $CO_2$ from $CH_4$ is reduced by less than 10%, measured at 35° C. and a pressure of 100 psia, compared to selectivity of a crosslinked membrane without a bulky diamino compound.

* * * * *

UNITED STATES PATENT AND TRADEMARK OFFICE
CERTIFICATE OF CORRECTION

PATENT NO.       : 9,718,923 B2
APPLICATION NO.  : 14/757447
DATED            : August 1, 2017
INVENTOR(S)      : Stephen J. Miller et al.

It is certified that error appears in the above-identified patent and that said Letters Patent is hereby corrected as shown below:

In Claim 1, Line 47, please delete "compise" and insert --comprise-- in place thereof;

In Claim 4, Line 16, delete "2,2¹'" and insert --2,2'-- in place thereof;

In Claim 7, Line 27, please delete "0weight" and insert --0 weight-- in place thereof.

Signed and Sealed this
Twentieth Day of February, 2018

Andrei Iancu
*Director of the United States Patent and Trademark Office*